(12) United States Patent
Dong

(10) Patent No.: US 9,473,027 B2
(45) Date of Patent: Oct. 18, 2016

(54) VOLTAGE REGULATOR WITH HYBRID ADAPTIVE VOLTAGE POSITION AND CONTROL METHOD THEREOF

(71) Applicant: Monolithic Power Systems, Inc., San Jose, CA (US)

(72) Inventor: Yan Dong, San Jose, CA (US)

(73) Assignee: MONOLITHIC POWER SYSTEMS, INC., San Jose, CA (US)

( * ) Notice: Subject to any disclaimer, the term of this patent is extended or adjusted under 35 U.S.C. 154(b) by 0 days.

(21) Appl. No.: 14/548,180

(22) Filed: Nov. 19, 2014

(65) Prior Publication Data

US 2016/0141956 A1 May 19, 2016

Related U.S. Application Data

(60) Provisional application No. 62/029,209, filed on Jul. 25, 2014.

(51) Int. Cl.
*H02M 3/157* (2006.01)
*H02M 3/158* (2006.01)
*H02M 1/00* (2006.01)
*H02M 3/156* (2006.01)

(52) U.S. Cl.
CPC ............. *H02M 3/158* (2013.01); *H02M 3/157* (2013.01); *H02M 3/1584* (2013.01); *H02M 2001/0009* (2013.01); *H02M 2001/0025* (2013.01); *H02M 2003/1566* (2013.01)

(58) Field of Classification Search
CPC .... H02M 3/155; H02M 3/156; H02M 3/157; H02M 3/158
See application file for complete search history.

(56) References Cited

U.S. PATENT DOCUMENTS

| 2007/0064460 | A1* | 3/2007 | Siman-Tov | H02M 3/157 363/132 |
| 2010/0072970 | A1* | 3/2010 | Ouyang | H02M 3/1588 323/293 |
| 2010/0141222 | A1 | 6/2010 | Ouyang | |
| 2012/0308218 | A1* | 12/2012 | Galloway | H02M 3/156 396/206 |
| 2013/0049628 | A1* | 2/2013 | Kwong | G09G 3/3406 315/250 |
| 2014/0300292 | A1* | 10/2014 | Howes | H02M 3/156 315/294 |

* cited by examiner

*Primary Examiner* — Jeffrey Gblende

(57) ABSTRACT

A voltage regulator with hybrid adaptive voltage position includes a resistor, a controllable current source, a current DAC and an error amplifier. The resistor has a first terminal coupled to the output voltage of the voltage regulator and a second terminal. The controllable current source is coupled to the second terminal of the resistor to provide a main current proportional to the output current of the voltage regulator. The current DAC is configured to receive a digital signal and the output current, and provide a tuning current to the second terminal of the resistor based on the digital signal and the output current. The error amplifier generates a compensation signal based on a reference voltage and the voltage at the second terminal of the resistor, so as to adjust the output voltage of the voltage regulator.

13 Claims, 5 Drawing Sheets

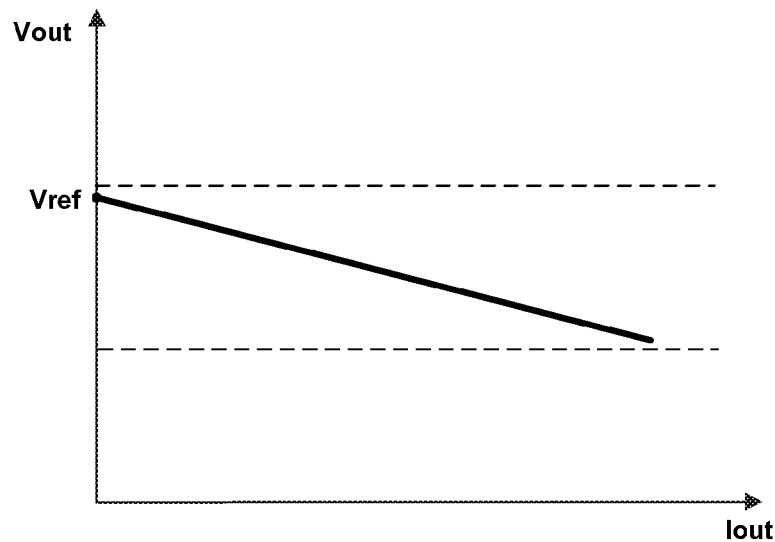
FIG. 1A *(Prior Art)*
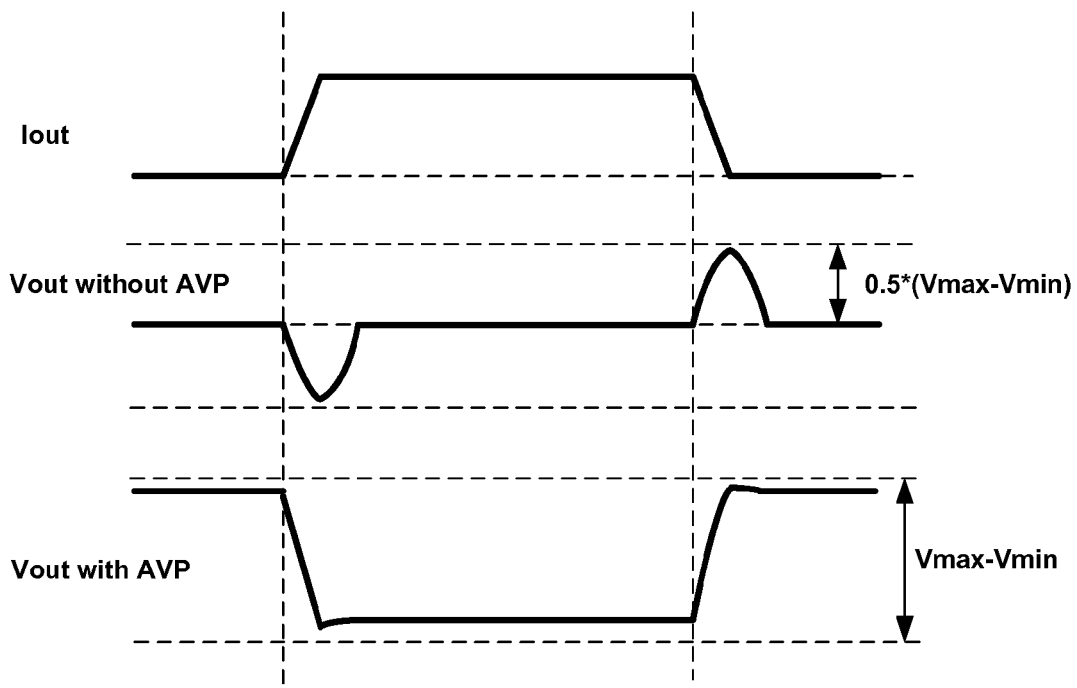
FIG. 1B *(Prior Art)*

VOLTAGE REGULATOR WITH HYBRID ADAPTIVE VOLTAGE POSITION AND CONTROL METHOD THEREOF

TECHNICAL FIELD

The present invention generally relates to electronic circuits, and more particularly, relates to voltage regulators with adaptive voltage position and control methods thereof.

BACKGROUND

In high current voltage regulators used in laptop, desktop, server and telecom applications, adaptive voltage positioning (AVP) control is widely used to achieve good transient performance and reduce load power consumption. FIG. 1A illustrates the basic principle of AVP, wherein Vout represents the output voltage of the voltage regulator, Iout represents the output current of the voltage regulator and Vref represents a reference voltage. As shown in FIG. 1, the output voltage Vout decreases when the output current Iout increases. The relationship between the output voltage Vout ad the output current Iout can be expressed as:

$$Vout = Vref - Rdroop * Iout \quad (1)$$

wherein Rdroop represents the slope.

FIG. 1B compares load transient response of voltage regulators with and without AVP. As shown in the figure, for voltage regulators without AVP, because of undershoot and overshoot at the output voltage Vout during load transient period, only half of the voltage tolerance window can be used. While in voltage regulators with AVP, the output voltage Vout is controlled to be slightly higher than a minimum value Vmin at full load, and a little bit lower than a maximum value Vmax at light load. As a result, the entire voltage tolerance window can be used during load transient period, which allows a smaller output capacitor in the voltage regulator. Furthermore, since the output voltage Vout with AVP decreases when the output current Iout increases, the output power at full load is degraded, which greatly facilitates the thermal design.

FIG. 2 schematically illustrates a widely used prior art wherein AVP is achieved by a current K0*Iout flowing through an external resistor R1. In this prior art, the relationship between the output voltage Vout and the output current Iout can be expressed as:

$$Vout = Vref - R1 * K0 * Iout \quad (2)$$

The slope Rdroop can be expressed as:

$$Rdroop = R1 * K0 \quad (3)$$

As shown in equation (3), the slope Rdroop is determined by the external resistor R1. It is hard to be adjusted on-line during system debugging and hard to fulfill the requirement of different applications.

SUMMARY

The embodiments of the present invention are directed to a controller used in a voltage regulator with adaptive voltage position, wherein the voltage regulator is configured to provide an output voltage and an output current, and comprises a resistor having a first terminal coupled to the output voltage and a second terminal. The controller comprises: a controllable current source coupled to the second terminal of the resistor, wherein the controllable current source is configured to provide a main current proportional to the output current; a current digital-analog converter configured to receive a digital signal and the output current, wherein based on the digital signal and the output current, the current digital-analog provides a tuning current to the second terminal of the resistor; and an error amplifier having a first input terminal, a second input terminal and an output terminal, wherein the first input terminal is configured to receive a reference voltage, the second input terminal is coupled to the second terminal of the resistor, and the output terminal is configured to provide a compensation signal to adjust the output voltage.

The embodiments of the present invention are also directed to a voltage regulator with adaptive voltage position, comprising: a switching circuit configured to provide an output voltage and an output current; a voltage sensing circuit coupled to the switching circuit, wherein based on the output voltage, the voltage sensing circuit provides a voltage sensing signal indicative of the output voltage; a current sensing circuit coupled to the switching circuit, wherein based on the output current, the current sensing circuit provides a current sensing signal indicative of the output current; a resistor having a first terminal and a second terminal, wherein the first terminal is coupled to the voltage sensing circuit to receive the voltage sensing signal; a controllable current source coupled to the second terminal of the resistor, wherein the controllable current source is configured to provide a main current proportional to the current sensing signal; a current digital-analog converter configured to receive a digital signal and the current sensing signal, wherein based on the digital signal and the current sensing signal, the current digital-analog converter provides a tuning current to the second terminal of the resistor; an error amplifier having a first input terminal, a second input terminal and an output terminal, wherein the first input terminal is configured to receive a reference voltage, the second input terminal is coupled to the second terminal of the resistor, and the output terminal is configured to provide a compensation signal; and a control circuit coupled to the output terminal of the error amplifier to receive the compensation signal, wherein the control circuit generates a control signal to control the switching circuit based on the compensation signal.

The embodiments of the present invention are further directed to a control method used in a voltage regulator with adaptive voltage position, wherein the voltage regulator is configured to provide an output voltage and an output current, and comprises a resistor having a first terminal coupled to the output voltage and a second terminal. The control method comprises: providing a main current proportional to the output current to the second terminal of the resistor; receiving a digital signal; generating a tuning current based on the digital signal and the output current; providing the tuning current to the second terminal of the resistor; amplifying the difference between a reference voltage and the voltage at the second terminal of the resistor, and generating a compensation signal; and adjusting the output voltage based on the compensation signal.

BRIEF DESCRIPTION OF THE DRAWINGS

The present invention can be further understood with reference to the following detailed description and the appended drawings, wherein like elements are provided with like reference numerals.

FIG. 1A illustrates the basic principle of AVP control.

FIG. 1B illustrates waveforms of voltage regulators with and without AVP during load transient.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2:
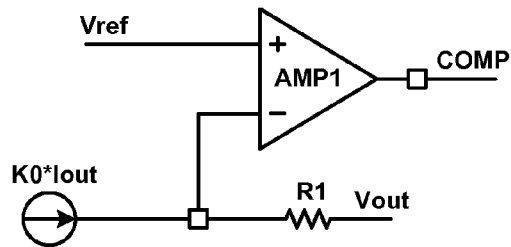
FIG. 2 schematically illustrates a widely used prior art of AVP.
Figure 3:
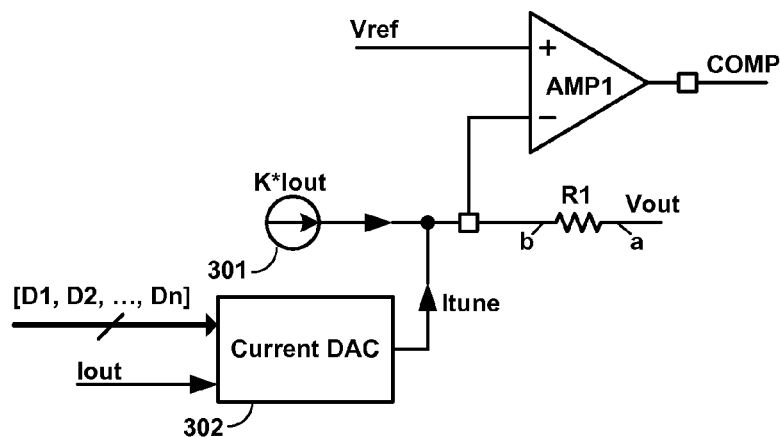
FIG. 3 schematically illustrates a hybrid AVP control in accordance with an embodiment of the present invention.

FIG. 3 schematically illustrates a hybrid AVP control in accordance with an embodiment of the present invention. Similar with FIG. 2, a resistor R1, a controllable current source 301, and an error amplifier AMP1 are provided. The resistor R1 has a first terminal (a) coupled to the output voltage Vout and a second terminal (b). The controllable current source 301 is coupled to the second terminal (b) of the resistor R1 and is configured to provide a main current (K*Iout) proportional to the output current Iout. The error amplifier AMP1 has a non-inverting input terminal, an inverting input terminal and an output terminal, wherein the non-inverting input terminal is configured to receive a reference voltage Vref, the inverting input terminal is coupled to the second terminal (b) of the resistor R1, and the output terminal is configured to provide a compensation signal COMP to adjust the output voltage Vout of the voltage regulator.

Compared with the prior art shown in FIG. 2, the embodiment shown in FIG. 3 further comprises a current digital-analog converter (DAC) 302. The current DAC 302 is configured to receive a digital signal [D1, D2 . . . Dn] and the output current Iout. Based on the digital signal [D1, D2 . . . Dn] and the output current Iout, the current DAC 302 provides a tuning current Itune to the second terminal (b) of the resistor R1. The digital signal [D1, D2 . . . Dn] may be provided by users or high-level controllers through a communication protocol (e.g. a power management bus) and stored in a register. It may also be directly stored in an EEPROM.

The current DAC 302 may have any suitable structure, and the tuning current Itune can be expressed as:

$$Itune = Iout * f(D1, D2, \ldots, Dn) \quad (4)$$

Then the voltage at the second terminal (b) of the resistor R1 can be expressed as:

$$Vb = R1 * [K*Iout + Iout*f(D1,D2,\ldots,Dn)] + Vout \quad (5)$$

Under the regulation of the error amplifier AMP1, the output voltage Vout can be expressed as:

$$Vout = Vref - R1*[K*Iout + Iout*f(D1,D2,\ldots,Dn)] \quad (6)$$

Based on equation (6), we can get the slope Rdroop is:

$$Rdroop = R1*[K + f(D1,D2,\ldots,Dn)] \quad (7)$$

This means, the slope Rdroop is determined by the resistor R1 and the digital signal [D1, D2, . . . , Dn]. As a result, during debugging, the slope Rdroop can be simply adjusted through changing the digital signal [D1, D2, . . . , Dn]. Artificially change of the resistor R1 is no longer needed, and flexible on-line tuning can be achieved. Furthermore, the requirement of Rdroop may be quite different in different applications. In Intel CPU applications, Rdroop is around 0.5 mohm, while in telecom applications, Rdroop can be around 5 mohm. Therefore, the resistor R1 outside the controller can be used for rough set of the slope Rdroop and the digital signal [D1, D2, . . . , Dn] can be used to for fine set, which greatly reduces the bit number of the current DAC and the design burden of a large current DAC range.

Figure 4:
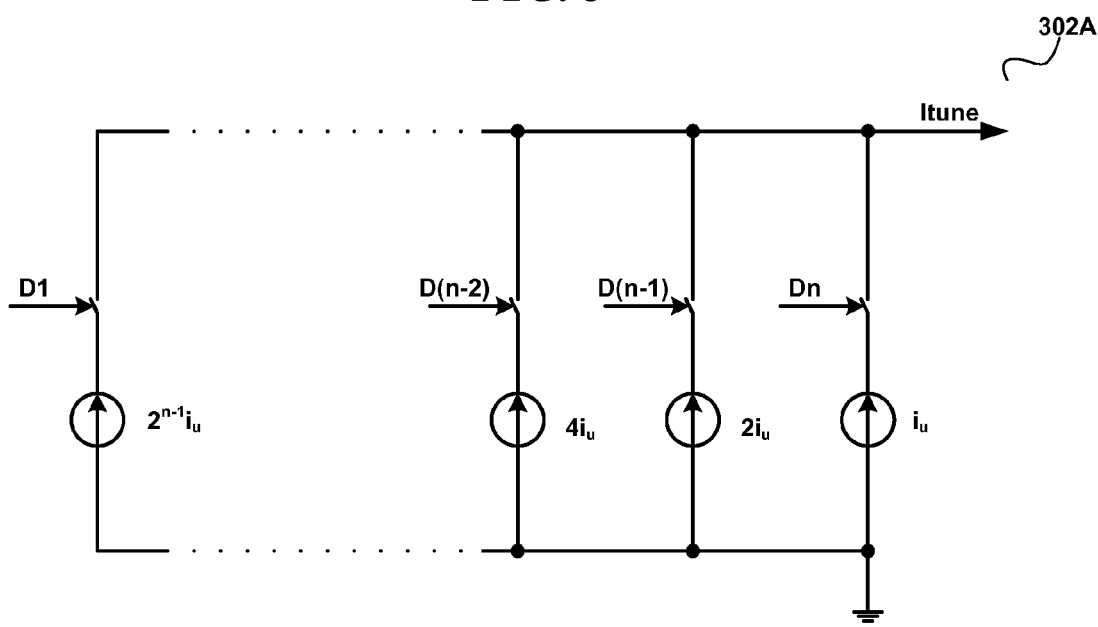
FIG. 4 schematically illustrates a current DAC 302A in accordance with an embodiment of the present invention.

FIG. 4 schematically illustrates a current DAC 302A in accordance with an embodiment of the present invention. The current DAC 302A comprises a plurality of parallel branches, wherein each branch has a switch controlled by the digital signal [D1, D2, . . . , Dn] and a current source providing a current proportional to the output current Iout. In the embodiment shown in FIG. 4, there are n branches, and the switches in the branches are respectively controlled by D1, D2, . . . , and Dn. The current provided by the current source in the branches are respectively $2^{n-1} i_u, \ldots, 4 i_u, 2 i_u$ and $i_u$, wherein $$i_u = 2^{-n} * K_{DAC} * Iout \quad (8)$$

$K_{DAC}$ represents the coefficient of the current DAC 302A. Based on equation (8) and the structure shown in FIG. 4, the tuning current Itune can be expressed as:

$$Itune = (D1*2^{-1} + D2*2^{-2} + \ldots + Dn*2^{-n}) * K_{DAC} * Iout \quad (9)$$

And the slope Rdroop can be expressed as:

$$Rdroop = R1 [K + (D1*2^{-1} + D2*2^{-2} + \ldots + Dn*2^{-n}) * K_{DAC}] \quad (10)$$

Figure 5:
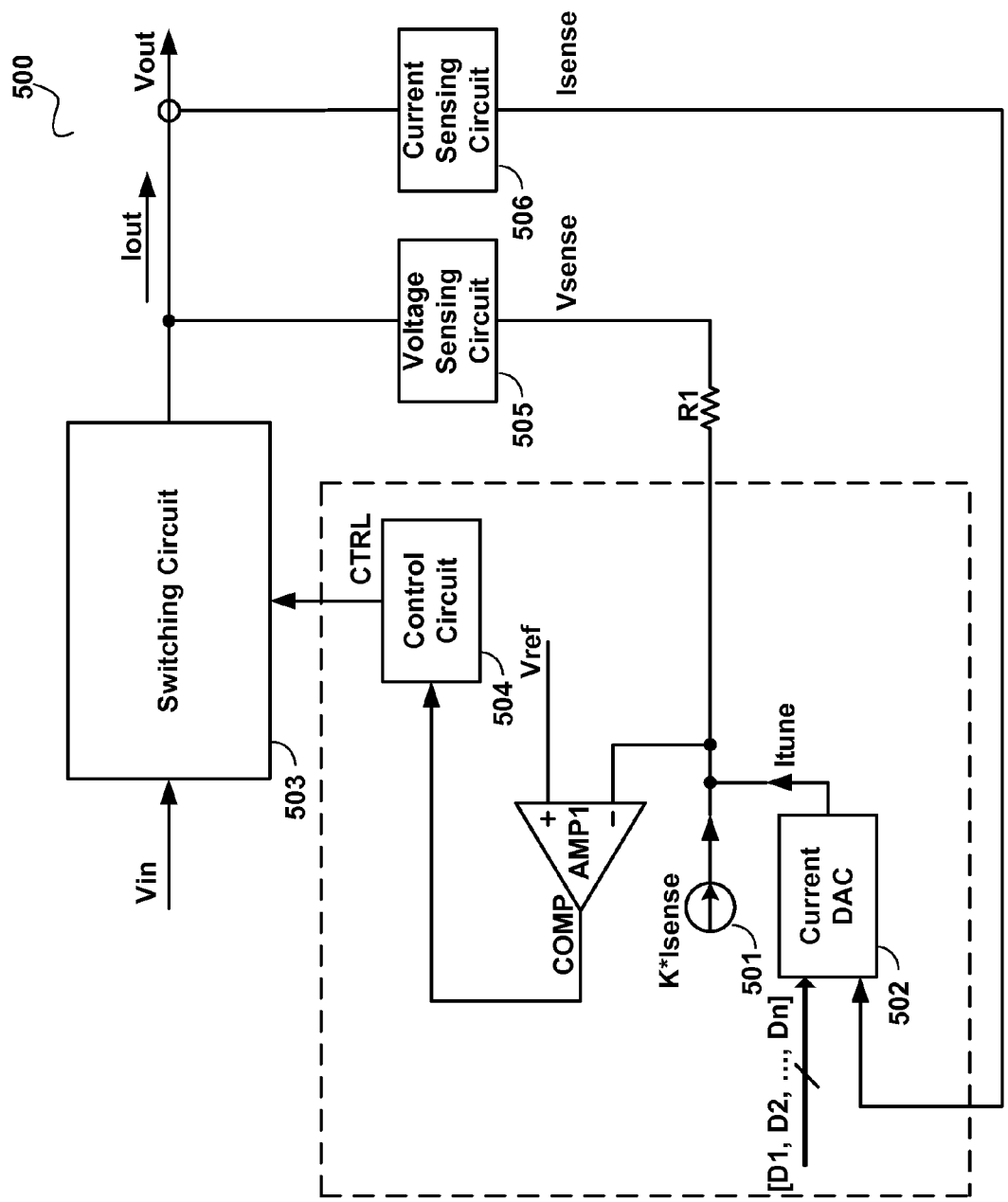
FIG. 5 is a block diagram of a voltage regulator 500 in accordance with an embodiment of the present invention.

FIG. 5 is a block diagram of a voltage regulator 500 in accordance with an embodiment of the present invention. The voltage regulator 500 comprises a controllable current source 501, a current DAC 502, a switching circuit 503, a control circuit 504, a voltage sensing circuit 505, a current sensing circuit 506 and an error amplifier AMP1. The switching circuit 503 has an input terminal and an output terminal, wherein the input terminal is configured to receive an input voltage Vin and the output terminal is configured to provide an output voltage Vout and an output current Iout. The switching circuit 503 may be configured in any known DC-DC topologies, such as BUCK, BOOST, etc. The voltage sensing circuit 505 is coupled to output terminal of the switching circuit 503, wherein based on the output voltage Vout, the voltage sensing circuit 505 generates a voltage sensing signal Vsense indicative of the output voltage Vout. The current sensing circuit 506 is coupled to the output terminal of the switching circuit 503, wherein based on the output current Iout, the current sensing circuit 506 generates a current sensing signal Isense indicative of the output current Iout. The current sensing circuit 506 may utilize any suitable current sensing technologies, such as current sensor, current sensing resistor and so on.

The resistor R1 has a first terminal and a second terminal, wherein the first terminal is coupled to the voltage sensing circuit 505 to receive the voltage sensing signal Vsense. The controllable current source 501 is coupled to the second terminal of the resistor R1 to provide a main current (K*Isense) proportional to the current sensing signal Isense. The current DAC 502 is configured to receive a digital signal [D1, D2, . . . , Dn] and the current sensing signal Isense, wherein based on the digital signal [D1, D2, . . . , Dn] and the current sensing signal Isense, the current DAC 502 provides a tuning current Itune to the second terminal of the resistor R1. The current DAC 502 may have any suitable structure. It may have a structure similar to the current DAC 302A shown in FIG. 4, wherein the current provided by the current source in the plurality of branches are proportional to the current sensing signal Isense.

The error amplifier AMP1 has a non-inverting input terminal, an inverting input terminal and an output terminal, wherein the non-inverting input terminal is configured to receive a reference voltage Vref, the inverting input terminal is coupled to the second terminal of the resistor R1, and the output terminal is configured to provide a compensation signal COMP.

The control circuit 504 is coupled to the output terminal of the error amplifier AMP1 to receive the compensation signal COMP, wherein based on the compensation signal COMP, the control circuit 504 generates a control signal CTRL to control the switching circuit 503. The control circuit 504 may utilize any suitable control method, such as fixed frequency peak current control, off-time control, etc.

For the embodiment shown in FIG. 5, the tuning current Itune can be expressed as:

$$I\text{tune}=I\text{sense}*f(D1,D2,\ldots,Dn)=K_{sense}*I\text{out}*f(D1,D2,\ldots,Dn) \quad (11)$$

wherein $K_{sense}$ is the coefficient of the current sensing circuit 506. The slope Rdroop can be expressed as:

$$R\text{droop}=R1*K_{sense}*[K+f(D1,D2,\ldots,Dn)] \quad (12)$$

Figure 6:
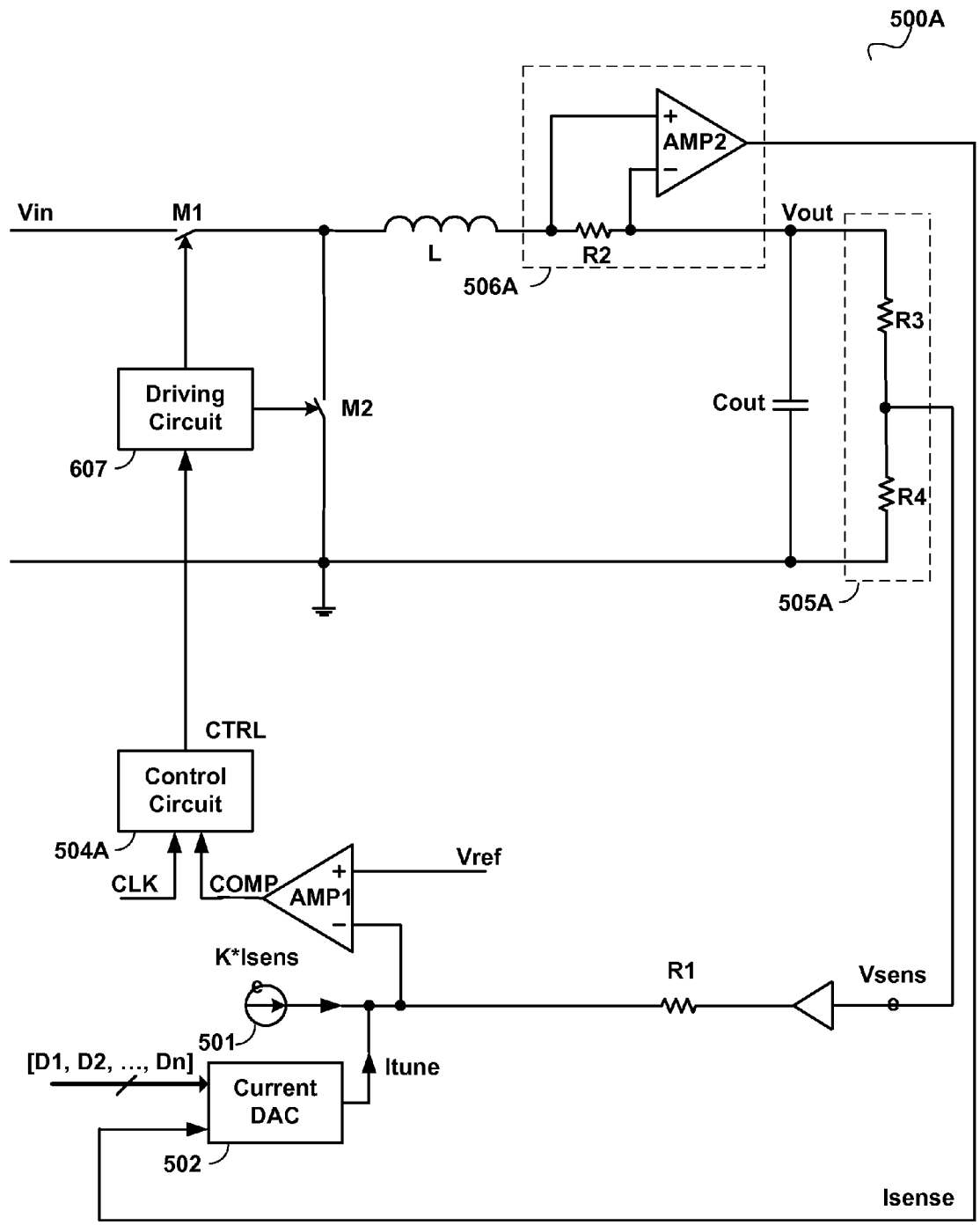
FIG. 6 schematically illustrates a voltage regulator 500A in accordance with an embodiment of the present invention.

FIG. 6 schematically illustrates a voltage regulator 500A in accordance with an embodiment of the present invention. In this embodiment, the switching circuit is configured in a synchronous BUCK circuit having switches M1, M2, an inductor L and a capacitor Gout. The voltage sensing circuit 505A comprises a voltage divider consisting of resistors R3 and R4. The voltage sensing signal Vsense is gained from the common node of the resistors R3 and R4, and then provided to the first terminal of the resistor R1 through a buffer. The current sensing circuit 506A comprises a resistor R2 and an error amplifier AMP2 connected as shown in FIG. 6. The control circuit 504A further receives a clock signal CLK besides the compensation signal COMP. It utilizes a fixed frequency peak current control and generates the control signal CTRL to control the switches M1 and M2 through a driving circuit 607.

Figure 7:
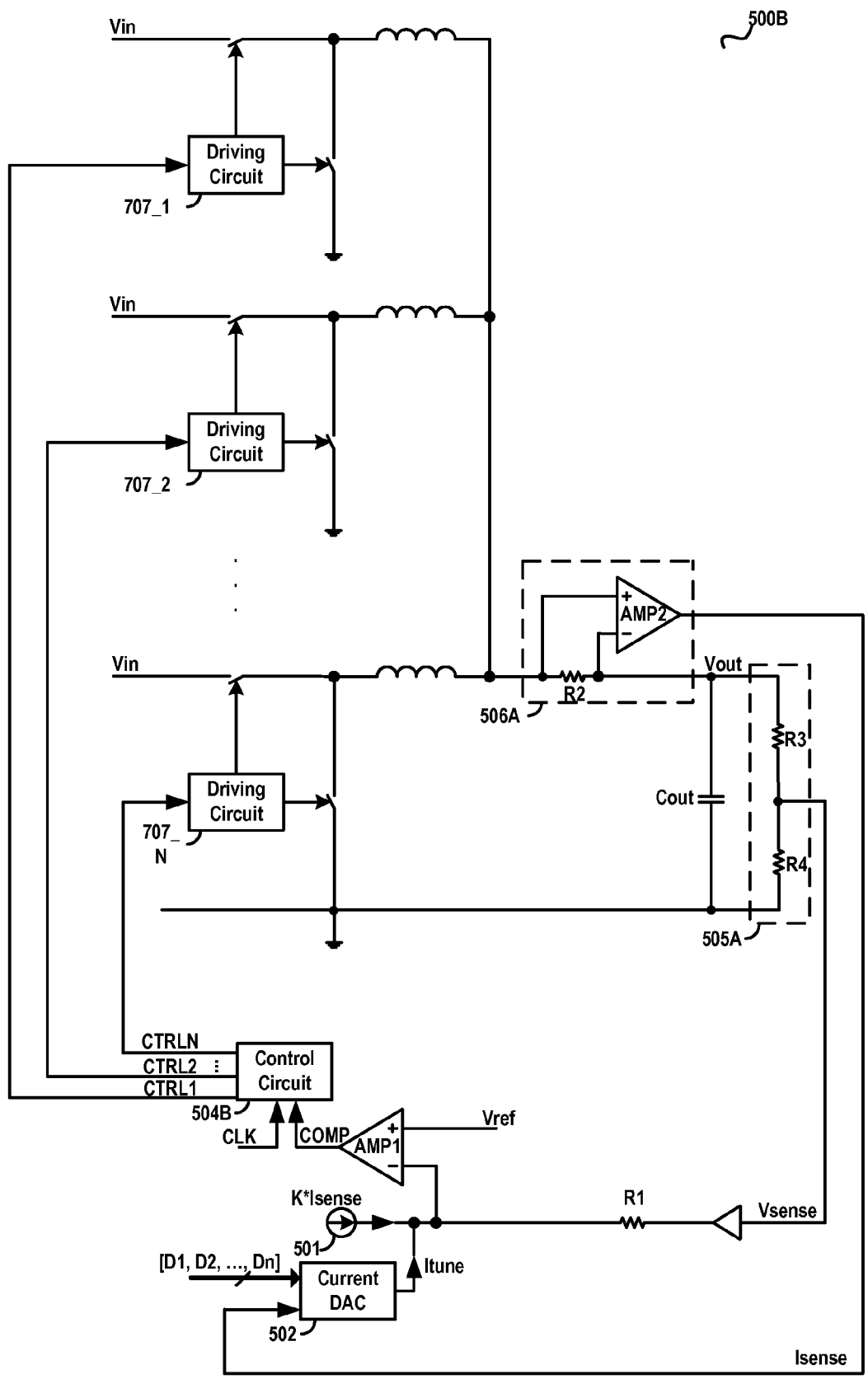
FIG. 7 schematically illustrates a multi-phase voltage regulator 500B in accordance with an embodiment of the present invention.

FIG. 7 schematically illustrates a multi-phase voltage regulator 500B in accordance with an embodiment of the present invention. As shown in FIG. 7, the switching circuit of the voltage regulator 500B includes a plurality of BUCK circuits connected in parallel. The control circuit 504B receives the clock signal CLK and the compensation signal COMP, and generates control signals CTRL1~CTRLN to respectively control the plurality of BUCK circuits through driving circuits 707_1~707_N, wherein N is an integer larger than one.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in a voltage regulator with adaptive voltage position, wherein the voltage regulator is configured to provide an output voltage and an output current, and comprises a resistor having a first terminal coupled to the output voltage and a second terminal, the controller comprises:
    a controllable current source coupled to the second terminal of the resistor, wherein the controllable current source is configured to provide a main current proportional to the output current;
    a current digital-analog converter configured to receive a digital signal and the output current, wherein based on the digital signal and the output current, the current digital-analog provides a tuning current to the second terminal of the resistor to vary the slope of the output voltage relative to the output current, and wherein the tuning current is proportional to the output current and a function of the digital signal; and
    an error amplifier having a first input terminal, a second input terminal and an output terminal, wherein the first input terminal is configured to receive a reference voltage, the second input terminal is coupled to the second terminal of the resistor, and the output terminal is configured to provide a compensation signal to adjust the output voltage.

2. The controller of claim 1, wherein the voltage regulator further comprises:
    a switching circuit having an input terminal and an output terminal, wherein the input terminal is configured to receive an input voltage, and wherein based on the input voltage, the switching circuit generates the output voltage and output current at the output terminal;
    a voltage sensing circuit having an input terminal and an output terminal, wherein the input terminal is coupled to the output terminal of the switching circuit, the output terminal is coupled to the first terminal of the resistor to provide a voltage sensing signal indicative of the output voltage; and
    a current sensing circuit having an input terminal and an output terminal, wherein the input terminal is coupled to the output terminal of the switching circuit, the output terminal is coupled to the current digital-analog converter to provide a current sensing signal indicative of the output current;
    wherein the controller further comprises:
        a control circuit coupled to the output terminal of the error amplifier to receive the compensation signal, wherein based on the compensation signal, the control circuit generates a control signal to control the switching circuit.

3. The controller of claim 1, wherein the digital signal is received through a power management bus and stored in a register.

4. The controller of claim 1, wherein the current digital-analog converter comprises a plurality of parallel branches, and wherein each of the plurality of branches has:
   a switch controlled by the digital signal; and
   a current source serially coupled to the switch, wherein the current source provides a current proportional to the output current.

5. The controller of claim 4, wherein the digital signal has a plurality of bits respectively controlling the plurality of switches in the plurality of parallel branches.

6. A voltage regulator with adaptive voltage position, comprising:
   a switching circuit configured to provide an output voltage and an output current;
   a voltage sensing circuit coupled to the switching circuit, wherein based on the output voltage, the voltage sensing circuit provides a voltage sensing signal indicative of the output voltage;
   a current sensing circuit coupled to the switching circuit, wherein based on the output current, the current sensing circuit provides a current sensing signal indicative of the output current;
   a resistor having a first terminal and a second terminal, wherein the first terminal is coupled to the voltage sensing circuit to receive the voltage sensing signal;
   a controllable current source coupled to the second terminal of the resistor, wherein the controllable current source is configured to provide a main current proportional to the current sensing signal;
   a current digital-analog converter configured to receive a digital signal and the current sensing signal, wherein based on the digital signal and the current sensing signal, the current digital-analog converter provides a tuning current to the second terminal of the resistor to vary the slope of the output voltage relative to the output current, and wherein the tuning current is proportional to the current sensing signal and a function of the digital signal;
   an error amplifier having a first input terminal, a second input terminal and an output terminal, wherein the first input terminal is configured to receive a reference voltage, the second input terminal is coupled to the second terminal of the resistor, and the output terminal is configured to provide a compensation signal; and
   a control circuit coupled to the output terminal of the error amplifier to receive the compensation signal, wherein based on the compensation signal, the control circuit generates a control signal to control the switching circuit.

7. The voltage regulator of claim 6, wherein the digital signal is received through a power management bus and stored in a register.

8. The voltage regulator of claim 6, wherein the current digital-analog converter comprises a plurality of parallel branches, and wherein each of the plurality of branches has:
   a switch controlled by the digital signal; and
   a current source serially coupled to the switch, wherein the current source provides a current proportional to the current sensing signal.

9. The voltage regulator of claim 8, wherein the digital signal has a plurality of bits respectively controlling the plurality of switches in the plurality of parallel branches.

10. The voltage regulator of claim 6, wherein the switching circuit is a BUCK circuit.

11. A control method used in a voltage regulator with adaptive voltage position, wherein the voltage regulator is configured to provide an output voltage and an output current, and comprises a resistor having a first terminal coupled to the output voltage and a second terminal, the control method comprises:
   providing a main current proportional to the output current to the second terminal of the resistor;
   receiving a digital signal;
   generating a tuning current based on the digital signal and the output current to vary the slope of the output voltage relative to the output current, and wherein the tuning current is proportional to the output current and a function of the digital signal;
   providing the tuning current to the second terminal of the resistor;
   amplifying the difference between a reference voltage and the voltage at the second terminal of the resistor, and generating a compensation signal; and
   adjusting the output voltage based on the compensation signal.

12. The control method of claim 11, further comprising:
   sensing the output voltage and providing a voltage sensing signal indicative of the output voltage to the first terminal of the resistor;
   sensing the output current and generating a current sensing signal indicative of the output current; wherein
   the main current and the tuning current are generated based on the current sensing signal.

13. The control method of claim 11, wherein the digital signal is received through a power management bus and stored in a register.

* * * * *